United States Patent [19]
Lai

[11] Patent Number: 5,935,355
[45] Date of Patent: Aug. 10, 1999

[54] METHOD OF MANUFACTURING ACRYLIC BOARDS CONTAINING REAL FLOWER MATERIALS

[76] Inventor: Wen Yan Lai, P.O. Box 82-144, Taipei, Taiwan

[21] Appl. No.: 08/850,107

[22] Filed: May 1, 1997

[51] Int. Cl.⁶ .............................. B28B 11/08; B28B 23/00
[52] U.S. Cl. ........................... 156/57; 156/222; 156/242; 156/250; 264/271.1; 264/279.1; 264/295
[58] Field of Search .............................. 156/57, 222, 242, 156/250; 264/257, 279, 279.1, 295, 296, 271.1

[56] References Cited

U.S. PATENT DOCUMENTS 2,300,495  11/1942  Gerhart ................................. 264/279.1
5,456,776  10/1995  Noguchi ..................................... 156/57

OTHER PUBLICATIONS

Working With Acrylic Plastics, Jack Wiley, Tab Books, Inc., pp. 5, 12, 46–48 & 231, 1986.

*Primary Examiner*—Richard Crispino
*Attorney, Agent, or Firm*—A & J

[57] ABSTRACT

A method of manufacturing acrylic boards containing real flower materials includes adhering real flower materials to an artificial fiber paper or cloth using a glue solution soluble in an acrylic solution, the fiber cloth or paper and the real flower material capable of retaining their malleability in the congealed acrylic solution; and pouring the acrylic solution into a mold holding the fiber paper or cloth with the flower materials adhered thereto; and bending the acrylic board thus obtained to a desirable shape.

1 Claim, 2 Drawing Sheets

METHOD OF MANUFACTURING ACRYLIC BOARDS CONTAINING REAL FLOWER MATERIALS

BACKGROUND OF THE INVENTION

1. Field of the Invention

This invention relates generally to a method of making acrylic boards containing real flower materials, and more particularly to a method which enables mass production of acrylic boards containing real flower materials in a cost effective manner.

2. Description of the Prior Art

The market today has a demand for colorful acrylic products and acrylic products of special shapes. In order to meet consumers' demands, manufacturers have developed acrylic boards having compound materials.

In prior methods of making acrylic boards having compound materials, generally, the steps of cutting, gluing, and bending are adopted, in which bending may be proceeded in two different ways. One is to heat the acrylic board at a high temperature so that the entire acrylic board softens to allow bending. The other is to heat the acrylic board at a low temperature, i.e., heating only the part of the acrylic board that is to be bent at a suitable temperature. That part of the acrylic board is then bent to a desirable shape.

However, the compound material contained in the acrylic board will undergo thermal deformation when the acrylic solution congeals and will further become brittle. Therefore, the compound material will break or crack at the bend no matter which of the two methods are used to bend the acrylic board. Therefore, to obtain acrylic boards containing compound materials, manufacturers usually have the acrylic boards shaped and cut before adhering the compound materials thereto. However, such a process is time-consuming and complicated. Besides, the finished acrylic products are unable to display a smooth and graceful shape.

SUMMARY OF THE INVENTION

This invention relates generally to a method of making acrylic boards containing real flower materials, and more particularly to a method which enables mass production of acrylic boards containing real flower materials in a cost effective manner.

A primary object of the present invention is to provide a method of manufacturing acrylic boards containing real flower materials, wherein the real flower material contained in an acrylic board will not break or crack during bending of the acrylic board.

Another object of the present invention is to provide a method of manufacturing acrylic boards containing real flower materials on a mass scale in a cost effective manner.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
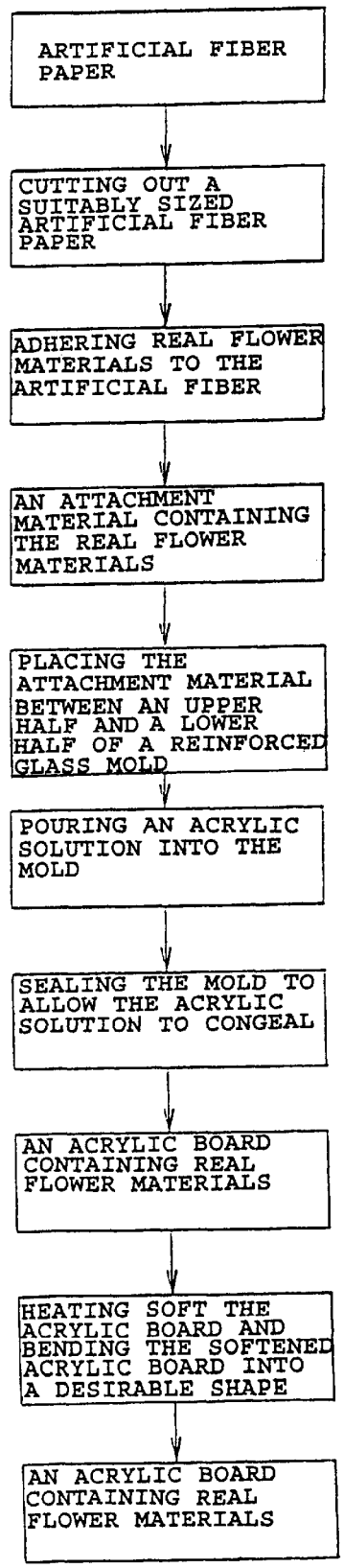
FIG. 1 is a flow chart of the method according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
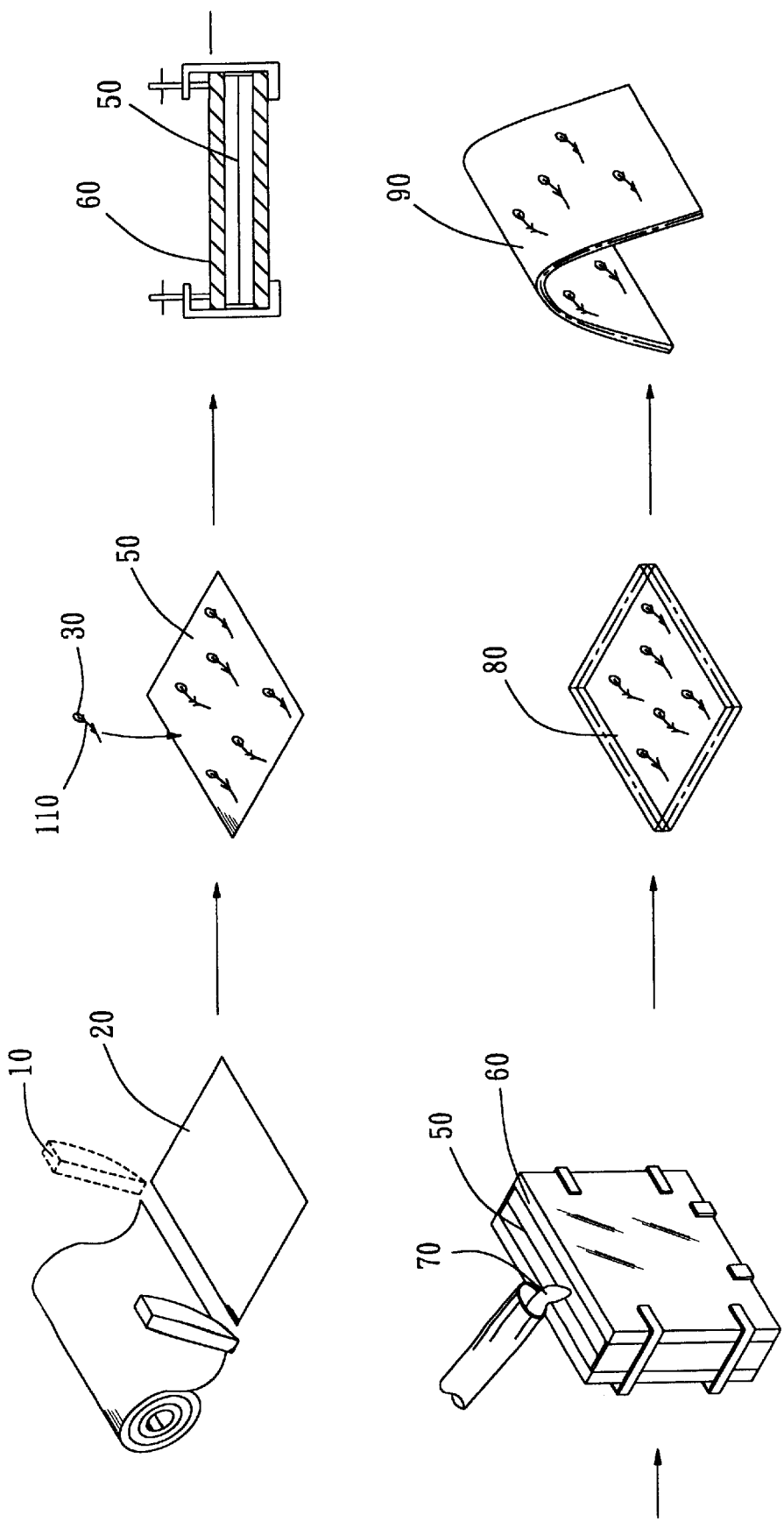
FIG. 2 is a schematic view illustrating the method according to the present invention.

FIG. 1 is a flow chart of the method for making the acrylic board according to the present invention, while FIG. 2 is a schematic diagram illustrating the method. The feature of the present invention is that it provides a breakthrough in the making of acrylic products and overcomes the difficulty of bending the acrylic board during processing as in the prior art.

With reference to both FIG. 1 and FIG. 2, a cutter is used to cut a suitable length of artificial fiber paper or cloth 10, the size of which is more or less than that of the acrylic board to be made. The fiber paper or cloth 10 is placed on a planar surface. Then real flowers 40 are adhered to the fiber paper or cloth 10 by use of a glue solution 30 to form an attachment material 50 with real flowers in an upper layer thereof. The attachment material 50 is clamped between the upper and lower halves of a reinforced glass mold 60, and an acrylic solution 70 is poured into the mold 60, which is then sealed to allow the acrylic solution to congeal. The acrylic solution 70 will enclose the attachment material 50 therein to obtain an acrylic board 80 containing real flowers therein.

Subsequently, the acrylic board 80 with the real flowers embedded therein is subject to the bending process. First of all, the acrylic board 80 is heated by use of a heating apparatus so that the acrylic board 80 starts to melt. The acrylic board is then bent with the help of a mold. An acrylic product 90 containing real flowers and having a desirable shape may thus be achieved.

The present invention utilizes artificial fiber paper or cloth 10 and real flowers 40 as basic materials. The two are bonded together by the glue solution 30 to form the attachment material 50. The attachment material 50 may maintain its elasticity and malleability during congelation of the acrylic solution 70 so that, when the acrylic board 80 is being bent, it may displace with the angle of bending and, therefore, will not crack or break.

In addition, the high penetrability of artificial fiber paper or cloth 10 and the solubility of glue solution 30 in the acrylic solution enable the real flower material 40 to attach to the artificial fiber paper or cloth 10 during congelation of the acrylic solution 70 to display an integral shape. Therefore, acrylic products according to the present invention may exhibit the texture of real flowers inside.

Furthermore, since artificial fiber paper and cloth is standardized material in the industry, it is readily obtainable. Therefore, there is no need to spend much time in drying the attaching paper as in the prior art. Besides, acrylic boards containing real flower materials may be mass produced in a cost effective manner.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A method of manufacturing acrylic boards containing real flower materials, comprising the steps of:

(a) cutting out a suitably sized artificial fiber paper or cloth using a cutter and placing the cut artificial fiber paper or cloth on a planar surface;

(b) adhering real flower materials to the artificial fiber paper or cloth using a glue solution so as to form an attachment material with an upper layer containing the real flower materials;

(c) placing the attachment material between an upper half and a lower half of a reinforced glass mold;

(d) pouring an acrylic solution into the mold and sealing the mold to allow the acrylic solution to congeal, which will envelop the attachment material in the middle thereof to achieve an acrylic board containing real flower materials; and (e) heating the acrylic board so that it melts, and bending the softened acrylic board into a desirable shape to obtain a shaped acrylic board containing real flower materials;

wherein the glue solution is used to bond the artificial flower materials to the artificial fiber paper or cloth and is characterized in that it is dissolved in the acrylic solution to allow the real flower materials to display its integral shape in the congealed acrylic solution.

* * * * *